Sept. 30, 1958 H. L. BERKHOUT 2,854,507

CIRCUIT ARRANGEMENT FOR USE IN TELEVISION RECEIVERS

Filed July 8, 1954

INVENTOR
HENDRICUS LOURENS BERKHOUT

BY [signature]

AGENT

United States Patent Office 2,854,507
Patented Sept. 30, 1958

2,854,507

CIRCUIT ARRANGEMENT FOR USE IN TELEVISION RECEIVERS

Hendricus Lourens Berkhout, Eindhoven, Netherlands, assignor, by mesne assignments, to North American Philips Company, Inc., New York, N. Y., a corporation of Delaware

Application July 8, 1954, Serial No. 442,082

Claims priority, application Belgium July 10, 1953

2 Claims. (Cl. 178—7.5)

This invention relates to circuit arrangements for use in television receivers for the reception of television signals modulated on a carrier wave in the positive sense, the demodulated signal without the direct-current component being supplied to a control electrode of the picture tube in the receiver.

Such receivers are already known from the starting period of the television technique. It has been found that the reproduction therein is unsatisfactory as a result of the absence of the direct-current component.

The object of the invention is to improve the reproduction of such receivers.

The circuit arrangement according to the invention exhibits the characteristic that the control voltage for automatic amplification control is controlled by the brightest picture components which occur in the demodulated signal comprising the direct-current component.

Consequently, when the automatic amplification control is active, the brightest portion of the incoming signal is always brought to one and the same level independently of the fact whether this brightest portion corresponds to maximum white or to a greyer colour and independently of the fact whether the variations in the amplitude of the incoming signal are due to fading phenomena or variations in the brightness of the image.

It has been found that in the presence of such automatic amplification control the quality of the reproduced image is considerably superior to that which is obtained in the absence of such a control.

As will appear hereinafter, the same control circuit may also be used if the receiver must at the same time be adapted for the reception of signals modulated on a carrier wave in the negative sense, in which event the direct-current component is neither supplied to the picture tube. When use is made of the same control circuit, the control voltage is derived, as before, from the demodulated signal comprising the direct-current component, but is determined by the peaks of the synchronising pulses instead of being determined by the brightest picture components.

In this case also satisfactory reproduction can be obtained.

Figure 1:
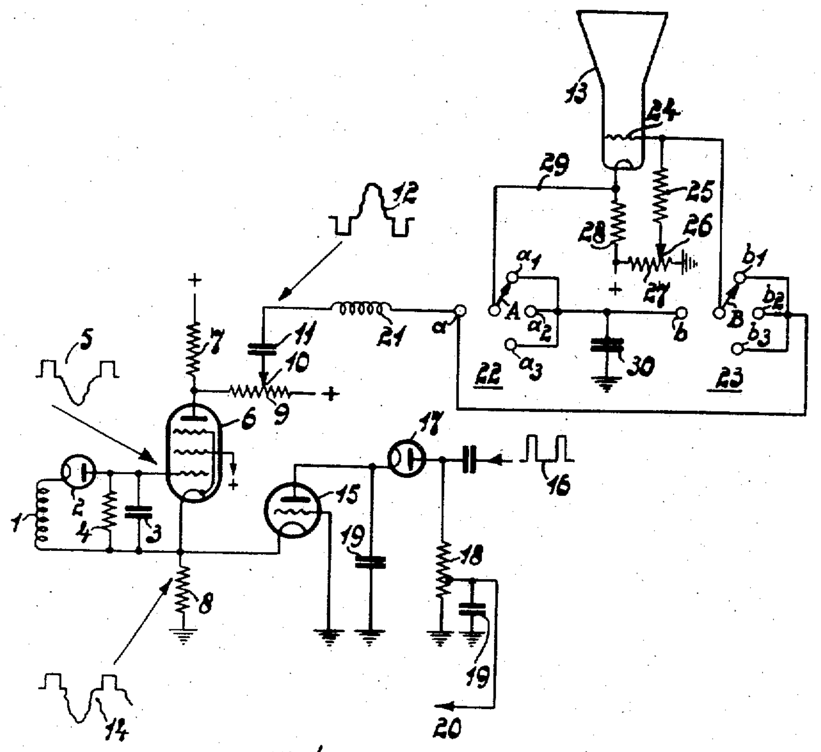

In order that the invention may be readily carried into effect, it will now be described with reference to the accompanying drawing, given by way of example, in which Fig. 1 shows one embodiment of the invention and Fig. 2 serves to explain the operation thereof.

The intermediate-frequency signal occurring in the output circuit of the last intermediate-frequency amplifying stage of the receiver is supplied by way of a coil 1 to the detector circuit comprising a rectifier 2 and the parallel combination of a capacitor 3 and a resistor 4.

A signal of the shape indicated at 5 occurs across the parallel combination 3, 4 in the reception of signals modulated on a carrier wave in the positive sense and with the polarity of the rectifier as indicated. This demodulated signal is supplied to the control grid circuit of a tube 6, the anode circuit of which includes a resistor 7 and the cathode circuit of which includes a resistor 8. Furthermore, the anode of tube 6 is connected to a potentiometer 9, the other end of which is connected to a point of constant potential. The potentiometer 9, which serves for contrast control, has derived from it by way of an adjustable tapping 10 and a capacitor 11, the signal indicated at 12, which is supplied to picture tube 13 in a manner which will be described hereinafter.

A signal of the form indicated at 14 occurs across the cathode resistor 8. It is important that the peaks of the synchronising pulses in the said signal are at a constant level independently of the strength of the incoming signal.

The voltage occurring across resistor 8 is supplied to the cathode of a tube 15, the control-grid of which is connected to earth. Fig. 2 shows the anode current-grid voltage characteristic curve of tube 15, in which the grid voltage $V_g$ and the anode current $i_a$ are plotted along the axis of abscissae and the axis of ordinates, respectively. As may be seen from Fig. 2, the tube is cut off when synchronising pulses are received and current does not flow in the tube before the amplitude of the picture components has reached a determined value which extends beyond the cut-off point $V_c$ of the tube.

The anode circuit of the tube is fed by rectification of voltage pulses 16 which may be derived from the line deflection circuit (not shown).

The voltage pulses 16 charge via a diode 17 and a resistor 18 a capacitor 19 which serves as an anode supply source. When current starts to flow in the tube 15, charge is extracted from the capacitor 19, which is supplemented again via resistor 18. This results in a decrease of the voltage across resistor 18. Part of this resistor, to which a smoothing capacitor 19 is connected in parallel, has derived from it, at 20, the control voltage for automatic volume control, which is supplied in known manner to one or more high-frequency or intermediate-frequency stages preceding the detector circuit 2, 3, 4 of the receiver.

When the maximum brightness of the picture components increases, the amplitude of the signal active at the control-grid circuit of tube 15 thus substantially remains unchanged as a result of the automatic amplification control.

Figure 2:
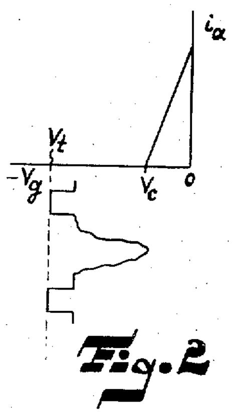

The amplitude of this signal is thus substantially equal to the spacing indicated in Fig. 2 between the fixed level $V_t$ of the peaks of the synchronising pulses and the cut-off point $V_c$ of the anode current-grid voltage characteristic curve of the tube 15.

The signal 12 which is derived from the anode circuit of tube 6 is supplied by way of a coil 21 to the contact *a* of a switch 22, which contact *a* is connected to contacts $b_1$, $b_2$, $b_3$ of a switch 23.

In the position shown of the switching arm B of switch 23, which is mechanically coupled to the switching arm A of switch 22, the signal is applied via contact $b_1$ and switching arm B to the control-grid 24 of picture tube 13. The control-grid 24 is connected by way of a resistor 25 to an adjustable tapping 26 on a potentiometer 27, which is connected between a point of positive potential and earth. The brightness of the image may be controlled by means of the adjustable tapping 26.

The cathode lead of the picture tube 13 includes a cathode resistor 28, which is connected to the same point of contant potential as is the resistor 27. The cathode of tube 13 is connected through a lead 29 to the contact arm A of switch 22, which makes contact with $a_1$. The contacts $a_1$, $a_2$ and $a_3$ are connected together, connected to contact *b* of switch 23 and connected to one side of a smoothing capacitor 30, the other side of which is connected to earth.

In the position of the switching arm A as shown, the capacitor 30 is thus connected parallel to resistor 28. This is also the case at the positions $a_2$ and $a_3$ of switch 22, which correspond to the position $b_2$ and $B_3$ of switch 23, the signal thus always being supplied to the control-grid 24. The fact that a plurality of contacts $a_1$, $a_2$, $a_3$ and $b_1$, $b_2$, $b_3$ are shown has no relationship with the circuit arrangement according to the invention, but is based on the fact that in many cases a plurality of television stations with positive modulation must be received, in which event the switches 22 and 23 are arranged on the same shaft with other switches for the sake of simplicity.

If the receiver must also be adapted for the reception of signals modulated on a carrier wave in the negative sense, the polarity of the television signals indicated at 5, 12 and 14 in Fig. 1 becomes reversed. The switching arms A and B of the switches 22 and 23 are in this case adjusted on the contacts *a* and *b*. The signal incoming at *a* is suplied via switching arm A and lead 29 to the cathode resistor 28 of the picture tube. The capacitor 30 is now not connected parallel to the resistor 28, but is connected via contact *b* and switching arm B to the control-grid 24 of picture tube 13, so that it is connected parallel to the resistor 25 and the right-hand part of potentiometer 27.

The polarity of the signal occurring in the cathode circuit of tube 6 is opposite to that of the signal indicated at 14. The signal then varies from a fixed level corresponding to a very bright image point. In Fig. 2 the polarity of the signal thus also inverses, so that this signal increases from a level $V_t$ to the right, the peaks of the synchronising pulses extending to the right and just causing the flow of current in tube 15, so that a control voltage is obtained again.

What is claimed is:

1. An automatic gain control circuit for use in a television receiver, comprising a source of a demodulated television signal, an electron discharge device having a control electrode and an output electrode, a source of pulses, a capacitor connected to said output electrode, a rectifier connected between said source of pulses and said capacitor thereby to rectify said pulses and provide a direct-current voltage charge on said capacitor to serve as an operating voltage for said output electrode, means connected to apply said demodulated television signal to said control electrode, said electron discharge device being normally biased in the cut-off condition so as to be rendered conductive only when the magnitude of said signal reaches a given amplitude whereby said electron discharge device tends to discharge said capacitor at a rate dependent upon the amplitude of said signal, and means connected to said capacitor to derive therefrom an automatic gain control voltage which varies in accordance with the rate of discharge of said capacitor.

2. An automatic gain control circuit for use in a television receiver, comprising a source of a demodulated television signal, an electron discharge device having a control electrode, an output electrode and a common electrode, a capacitor connected between said output electrode and said common electrode, a source of pulses, a rectifier connected between said source of pulses and said output electrode thereby to rectify said pulses and provide a direct-current voltage charge on said capacitor to serve as an operating voltage for said output electrode, a resistor connected between a terminal of said rectifier and said common electrode, and means connected to apply said demodulated television signal to said control electrode, said electron discharge device being normally biased in the cut-off condition so as to be rendered conductive only when the magnitude of said signal reaches a given amplitude whereby said electron discharge device tends to discharge said capacitor at a rate dependent upon the amplitude of said signal, whereby an automatic gain control voltage is produced across said resistor which varies in accordance with the rate of discharge of said capacitor.

References Cited in the file of this patent

UNITED STATES PATENTS

| | | |
|---|---|---|
| 1,951,533 | Schroter | Mar. 20, 1934 |
| 2,217,948 | Harnett et al. | Oct. 15, 1940 |
| 2,593,011 | Cotsworth | Apr. 15, 1952 |